US012338966B2

(12) United States Patent
Zhu et al.

(10) Patent No.: US 12,338,966 B2
(45) Date of Patent: Jun. 24, 2025

(54) LIGHT-EMITTING MOTOR-VEHICLE MODULE

(71) Applicant: VALEO VISION, Bobigny (FR)

(72) Inventors: Lingxuan Zhu, Bobigny (FR); Francois Bayle, Bobigny (FR); Xinyu Deng, Bobigny (FR)

(73) Assignee: VALEO VISION, Bobigny (FR)

( * ) Notice: Subject to any disclaimer, the term of this patent is extended or adjusted under 35 U.S.C. 154(b) by 0 days.

(21) Appl. No.: 18/564,876

(22) PCT Filed: May 30, 2022

(86) PCT No.: PCT/EP2022/064620
§ 371 (c)(1),
(2) Date: Nov. 28, 2023

(87) PCT Pub. No.: WO2022/253757
PCT Pub. Date: Dec. 8, 2022

(65) Prior Publication Data
US 2024/0384852 A1 Nov. 21, 2024

(30) Foreign Application Priority Data
May 31, 2021 (FR) ...................................... 2105735

(51) Int. Cl.
*F21S 41/40* (2018.01)
*F21S 41/143* (2018.01)
(Continued)

(52) U.S. Cl.
CPC ............. *F21S 41/40* (2018.01); *F21S 41/143* (2018.01); *F21S 41/151* (2018.01); *F21S 41/37* (2018.01)

(58) Field of Classification Search
CPC .......... F21S 41/40; F21S 41/43; F21S 41/143; F21S 41/151; F21S 41/153; F21S 41/37;
(Continued)

(56) References Cited

U.S. PATENT DOCUMENTS 4,733,335 A 3/1988 Serizawa et al.
6,076,945 A 6/2000 Matsubara et al.
(Continued)

FOREIGN PATENT DOCUMENTS

DE 10 2008 046 748 A1 3/2010
DE 10 2018 213 563 A1 2/2020
(Continued)

OTHER PUBLICATIONS

International Search Report mailed on Aug. 17, 2022 in PCT/EP2022/064620 filed on May 30, 2022 (6 pages).
(Continued)

*Primary Examiner* — Erin Kryukova
(74) *Attorney, Agent, or Firm* — Oblon, McClelland, Maier & Neustadt, L.L.P.

(57) ABSTRACT

A motor-vehicle light-emitting module includes a plurality of light sources configured to emit light rays, and a plurality of cavities each having a first aperture and a second aperture opposite the first aperture. Each light source is associated with one cavity, so that at least part of the light rays emitted by each light source enters via the first aperture of the associated cavity and exits said associated cavity via the second aperture. The light sources emit radially.

17 Claims, 3 Drawing Sheets

(51) Int. Cl.

| | |
|---|---|
| ***F21S 41/151*** | (2018.01) |
| ***F21S 41/37*** | (2018.01) |

(58) Field of Classification Search

CPC .......... F21S 43/26; F21S 43/265; F21S 43/50; F21S 43/51; F21S 43/332; F21V 7/0083; F21V 11/06; F21V 11/08; F21V 11/10; F21V 11/12; F21V 11/14; F21Y 2105/10; F21Y 2105/16

See application file for complete search history.

(56) References Cited

U.S. PATENT DOCUMENTS

| | | | | |
|---|---|---|---|---|
| 6,406,173 | B1 | 6/2002 | Serizawa et al. | |
| 2002/0018347 | A1 | 2/2002 | Shoji | |
| 2002/0163810 | A1 | 11/2002 | West et al. | |
| 2003/0128547 | A1 | 7/2003 | Shoji | |
| 2015/0085523 | A1* | 3/2015 | Gurtl | F21S 41/322 362/607 |
| 2015/0192264 | A1* | 7/2015 | Holzl | F21S 41/322 362/511 |
| 2018/0010754 | A1* | 1/2018 | Albou | H01L 33/06 |
| 2018/0087738 | A1* | 3/2018 | Zhu | F21S 43/15 |
| 2019/0016254 | A1* | 1/2019 | Salter | F21V 7/06 |
| 2019/0078751 | A1* | 3/2019 | Colombel | F21V 11/14 |
| 2019/0368689 | A1* | 12/2019 | Rötzer | F21V 5/04 |
| 2020/0072428 | A1* | 3/2020 | Simchak | F21S 41/255 |

FOREIGN PATENT DOCUMENTS

| | | | | | |
|---|---|---|---|---|---|
| EP | 372 1135 | A1 | | 10/2020 | |
| FR | 3074563 | B1 | * | 11/2019 | F21S 43/14 |
| JP | 3390413 | B2 | | 3/2003 | |
| JP | 3961652 | B2 | | 8/2007 | |
| KR | 20140112614 | A | * | 9/2014 | |
| WO | WO-2018069175 | A1 | * | 4/2018 | B60Q 1/0041 |

OTHER PUBLICATIONS

Preliminary French Search Report dated Jan. 27, 2022 in French Application 2105735 filed on May 31, 2021 (3 pages, with Translation of Categories).

* cited by examiner

LIGHT-EMITTING MOTOR-VEHICLE MODULE

TECHNICAL FIELD

The present invention relates to the field of the automotive industry, and more particularly relates to light-emitting devices allowing the presence of the motor vehicle to be signaled.

PRIOR ART

Motor-vehicle light-emitting devices are known that comprise a plurality of light sources configured to emit light rays and a plurality of light guides, each light source being optically coupled to a base of one of the light guides, so that at least part of the light rays generated by each light source is injected into the associated light guide. These light rays exit the guide via an exit surface opposite the base. The light sources are drivable individually or in groups. These light-emitting devices are said to be matrix-array devices because they make it possible to generate a plurality of "light-emitting pixels" in order to create many light-emitting functionalities in motor vehicles. Such light-emitting functionalities in particular make it possible to indicate to a neighboring vehicle one or more pieces of information regarding a state of the motor vehicle on which the device is mounted, such as for example information on state of charge, a breakdown, a speed and/or a future path of said motor vehicle. They also make it possible to indicate to a neighboring vehicle one or more pieces of information on a traffic situation that the neighboring vehicle may not have had the opportunity to detect directly.

In this context of matrix-array light-emitting devices, drawbacks of devices based on light guides are the high cost and complexity of their implementation. Another drawback of known devices is that luminous appearance is variable within a pixel, i.e. brightness differs depending on the observed segment of a given pixel. This non-uniformity is generally criticized by customers, who would like each pixel to have a uniform brightness.

Furthermore, devices based on light guides have a low luminous efficacy, because of losses coupling and guiding the light rays. Therefore the light sources must be powerful, this increasing electricity consumption and the amount of heat generated.

Lastly, these devices do not handle substantial variations in device depth well, this depth being measured in the overall direction of the beam emitted by the device. Specifically, it is complicated to manufacture components for devices of larger depth due to technical constraints of the manufacturing techniques employed, of injection molding in particular. It is thus impossible to manufacture said components using conventional processes, this increasing cost. However, the shapes desired by customers have increasingly pronounced curves, this implying very different depths depending on the place on the device where depth is measured.

SUMMARY OF THE INVENTION

Thus, the invention provides a motor-vehicle information-displaying device allowing the aforementioned drawbacks to be at least partially overcome. The displaying device according to the invention is easy to implement and makes it possible to obtain good pixel uniformity. It is also easy to adapt to various forms of curves while using elements of simple design. It has good photometric efficiency, this allowing power consumption and heating to be decreased, while guaranteeing high brightness. The limited heating makes it possible to use inexpensive materials with limited heat resistance. The good photometric efficiency further allows the number of light sources used to be decreased, or less expensive light sources to be used.

These features thus ensure the device is of low cost. It allows pixels to be displayed with a good level of uniformity, and well separated from one another.

In this regard, the invention relates to a motor-vehicle light-emitting module comprising:

- a plurality of light sources configured to emit light rays;
- a plurality of cavities each having a first aperture and a second aperture opposite the first aperture, each light source being associated with one cavity, so that at least part of the light rays emitted by each light source enters via the first aperture of the associated cavity and exits said associated cavity via the second aperture; the light sources emitting radially.

The expression "radially emitting" is understood to mean that light is emitted mainly laterally with respect to a mounting axis of the light source, and all around this axis. For example, in the case of a light-emitting diode (LED) the latter is mounted on a carrier that is generally planar, at least locally near the LED. The radial emission is then lateral with respect to an axis perpendicular to the plane of the carrier.

Advantageously, the emission of the light source has a symmetry of revolution about the mounting axis. This allows uniform illumination all around the light source.

When a radially emitting light source is installed facing the cavity, it has an emission peak oriented toward the partitions of said cavity. Thus most of the light rays emitted by the light source go directly to these partitions, and a small amount of these rays, or even none thereof, is oriented directly toward the second aperture, and exits the cavity without having encountered any partition.

Advantageously, the module may comprise one or more of the following features, implemented alone or in combination:

- the light sources are configured to be selectively activatable;
- the light-emitting module comprises a perforated mask located at a distance from the plurality of light sources in a direction of propagation of the light rays, the perforated mask comprising a grid forming a plurality of light-emitting cells facing the cavities and the associated light sources, each light-emitting cell being separate from a directly adjacent light-emitting cell;
- the light-emitting module comprises a mask carrier placed facing the second apertures, so that it is passed through by the light rays, and bearing the perforated mask;
- the mask carrier is a diffuser;
- the perforated mask is integrally formed with the mask carrier;
- the perforated mask and the mask carrier are obtained by bi-injection molding of plastics;
- the perforated mask is attached to the mask carrier, the perforated mask being securely fastened to the carrier by fastening means;
- the perforated mask is deposited on the mask carrier, the grid of the perforated mask being formed by a layer of an opaque material deposited on a face of the perforated mask;
- the cavities are formed by partitions of light color, and in particular of white color;

the partitions have at least one textured wall in order to scatter light rays that strike them;

the shape of the partitions, in longitudinal cross section, is that of two opposite trapezoids the large bases of which are common;

some partitions are composed of a superposition of a plurality of sub-partitions;

the light sources comprise one or more radially emitting light-emitting diodes.

The invention also relates to a motor-vehicle light-emitting device comprising at least one light-emitting module according to the invention. Advantageously, the light-emitting device is intended to be mounted at the rear of a motor vehicle.

BRIEF DESCRIPTION OF THE DRAWINGS

The invention will be better understood on reading the following description and on examining the accompanying figures.

DETAILED DESCRIPTION

The reference numbers of the first embodiment have been used to designate corresponding or identical elements of the second, third and fourth embodiments, these numbers however being increased by 200, 300 and 400. Reference is moreover made to the description of these elements given in the context of the first embodiment. In other words, elements of the second embodiment and beyond have similar numbering to those of the first, the tens and units of the reference numbers staying the same in all the embodiments, only the figure of the hundreds changing, the relevant number of hundreds being “2” in the second embodiment, “3” in the third embodiment, and “4” in the fourth embodiment. Reference is moreover made to the description of these elements given in the context of the preceding embodiments.

Figure 1:
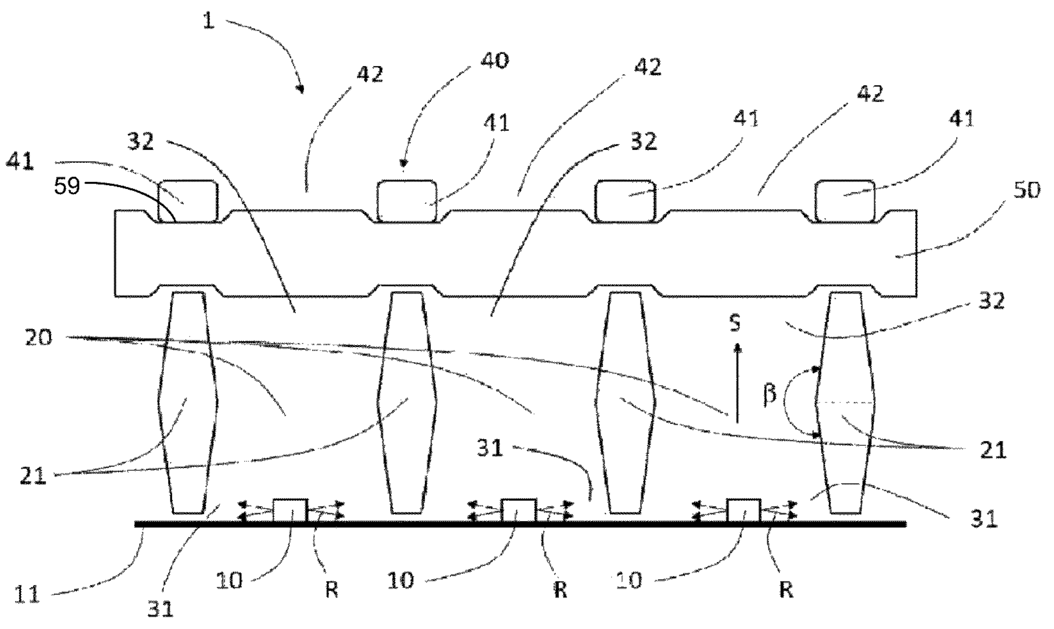
FIG. 1 is a schematic cross-sectional view of a module according to a first embodiment of the invention.

FIG. 1 is a schematic cross-sectional view of a module according to a first embodiment of the invention.

The module 1 comprises a plurality of light sources 10 placed on a carrier 11. For example, the light sources are LEDs. The carrier may be a printed circuit board (PCB) or an insulated metal substrate (IMS). It may also be a flex-board. In this case the carrier is intended to ensure delivery of electrical power to the light sources 10 from an electrical power source. Alternatively, the carrier may be a heat sink comprising no electrical tracks, the circuit used to deliver electrical power to the light sources being added thereto. The light sources 10 are configured to be selectively activatable. The drive module that allows them to be actuated is configured to be able to turn each light source 10 on and off individually or in groups.

Each light source 10 is associated with one cavity 20 having a first aperture 31 oriented toward the light source, and a second aperture 32 opposite the first aperture 31. In other words, with respect to the associated light source 10, the first aperture 31 is proximal and the second aperture is distal. Each cavity 20 for example corresponds to a through-hollow in a cavity-containing element of the module. Thus the cavity-containing element comprises a plurality of through-hollows, each hollow corresponding to one cavity 20, bounded by partitions 21. Each hollow corresponds to a pixel that it is desired to be able to light up. Alternatively, it is possible to use a plurality of cavity-containing elements juxtaposed side by side and that, when assembled, define the full gamut of pixels.

Each light source 10 is radially emitting, i.e. the light rays R emitted by the light source, when it is supplied with electricity, are oriented mainly laterally with respect to a mounting axis of the light source 10, and all around this axis. For example, in the case of an LED the radial emission is lateral with respect to an axis perpendicular to the plane of the carrier. Such light sources are described in more detail with reference to FIGS. 5*a* and 5*b*.

When the light source 10 is supplied with electricity, by conventional means (not shown in the figures), at least part of the emitted light rays R enter into the associated cavity 20 via the first aperture 31 and strike the partitions 21 of said cavity 20. They are reflected and/or scattered by said partitions 21 and part thereof exits from said associated cavity 20 via the second aperture 32. The partitions 21 are advantageously made of a scattering material, particularly of a light color, and in particular of a white color. Alternatively or additionally, the walls of the partitions 21 may have a scattering texture, in particular a graining. These features have the effect of scattering the light rays R. This makes it possible to obtain a good uniformity in respect of the lit-up appearance of a pixel.

The profile of each wall of the partition 21 has a re-entrant angle, i.e. it comprises two segments, in particular two rectilinear segments, making therebetween a re-entrant angle β, i.e. an angle larger than 180°, when it is observed from the cavity 20. Moreover, the angle β has a value lower than 270°. Thus the partition 21 has a cross section the shape of which is that of two opposite trapezoids the large bases of which are common. By way of example, the common base has been shown by a dotted line in the rightmost partition 21 in FIG. 1. The angle is obtuse when it is observed from inside the partition 21. Thus, when the cavity 20 is moved through from the first aperture 31 to the second aperture 32, the surface of its cross section decreases, reaches a minimum, in particular at the point where the profile of the walls makes an angle, then increases again.

This configuration makes it possible to obtain cavities 21 of substantial depth, in particular when the cavity-containing element is obtained by injection molding under pressure, the depth of the cavity 21 being the distance separating the first aperture 31 from the second aperture 32. Specifically, to guarantee the cavity-containing part demolds as it should, it is necessary to guarantee a minimum draft angle between the walls of the partitions 21 and the demolding axis. This draft angle is generally larger than 3°, and even larger than 5° when the wall has a texture such as for example a graining. However, it is also desirable for the thickness of the partition 21 to be limited. Since the maximum thickness of the partition 21 is approximately at its middle, it is possible to approximately double the height of said partition 21, with respect to the height that would be possible with a partition the thickness of which increased continuously from the first aperture 31 to the second aperture 32 or vice versa, and that had the same maximum thickness. Cavities 20 the depth of which may reach up to 20 mm are thus obtained. Moreover, this shape of the partitions 21 also enables better diffusion of light in the cavity 20, thus improving uniformity level.

Advantageously, each cavity 20 is associated with a single light source 10. This makes it possible to optimize the required flux because shadows that a plurality of light sources 10 placed facing the same cavity 20 might cast, one with respect to the next, are thus avoided. Such shadows would correspond to part of the light rays R emitted by a light source and intercepted by a neighboring light source associated with the same cavity. These light rays R would not reach the partitions 21 and would therefore not take part in the creation of the luminous function.

Alternatively it may sometimes be necessary to associate at least certain cavities 20, or even all the cavities 20, each with a plurality of light sources 10. This is particularly the case when using a single light source 10 per cavity would not allow a sufficient luminous flux to be obtained, for example either because each light source is not powerful enough, or because the luminous function to be performed requires a large quantity of light. Using a plurality of light sources 10 in association with a cavity 20 then allows the light flux available in a cavity 20 to be increased, despite the shadows cast.

In one preferred embodiment, the module 1 comprises a perforated mask 40 located at a distance from the light sources 10 in a direction of travel S of the light. The direction of travel of the light is to be understood to be the general direction in which the light rays propagate through the cavity 20, said direction being oriented from the first aperture 31 to the second aperture 32. The perforated mask comprises a grid 41 forming a plurality of light-emitting cells 42 facing the cavities 20 and the associated light sources 10. More precisely, each light-emitting cell 42 faces one cavity 20. Moreover, each light-emitting cell 42 is separate from a directly adjacent light-emitting cell 42. Each light-emitting cell 42 corresponds to one pixel.

The perforated mask 40 may be placed on a mask carrier 50. The mask carrier 50 is advantageously made of a transparent or translucent material. A translucent material scatters in its bulk, one example thereof being opaline. Alternatively or additionally, the mask carrier 50 has at least one textured face, in particular one having a graining. The translucent material and/or the presence of the graining allows the uniformity of the lit-up appearance of the pixel to be improved.

Figure 2:
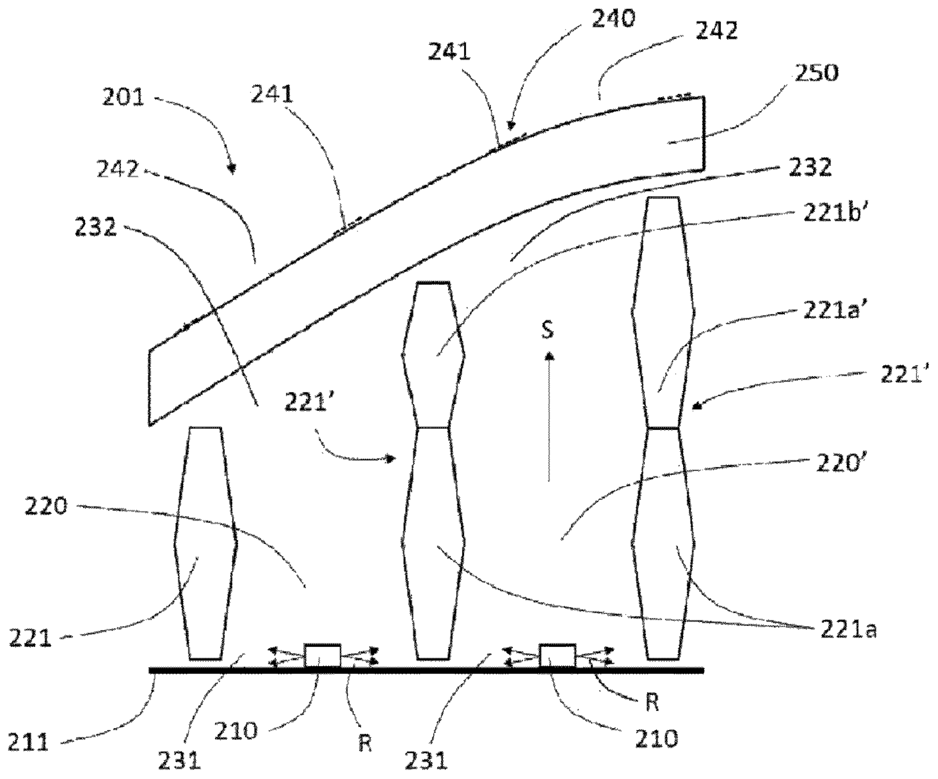
FIG. 2 is a schematic cross-sectional view of a module according to a second embodiment of the invention.

The perforated mask 40 may be fastened to the mask carrier 50, in particular by adhesive bonding or by welding 59. Alternatively, the perforated mask 40 and the mask carrier 50 form a part obtained by two-shot injection molding. In another alternative, the grid 41 is a layer of an opaque material deposited on one face of the perforated mask, and for example painted or printed on the mask 40. This alternative is shown in FIG. 2 (reference 241). This layer of opaque material may also be a layer of metal, for example one obtained by vacuum deposition. In the alternative where the layer is a layer of opaque material, the latter may form the perforated mask, and be deposited directly on the mask carrier.

It will be noted that all the alternatives described above in respect of the mask and mask carrier may be applied to all the embodiments of the present invention.

FIG. 2 is a schematic cross-sectional view of a module according to a second embodiment of the invention. This embodiment differs from the first embodiment in that certain cavities 220' have one or more partitions 221' obtained by superposition of two sub-partitions 221*a*, 221*a*', 221*b*'. The sub-partitions 221*a*, 221*a*', 221*b*' defining a partition 221' are aligned. They advantageously make contact. They define a cavity 220' of larger depth than the first embodiment. The sub-partitions 221*a* and 221*a*' have a similar or identical height, as do the sub-partitions 221*b*'. In contrast, the heights of sub-partitions 221*a* and 221*a*' on the one hand, and 221*b*' on the other hand, differ. In particular, the sub-partitions 221*b*' have a height smaller than the sub-partitions 221*a* and 221*a'*.

Advantageously, the sub-partitions 221*a* have the same height as the partitions 221 comprising a single sub-partition. The partitions 221 and the sub-partitions 221*a* form part of the same cavity-containing element. This makes it possible to use a first cavity-containing element located in proximity to the light sources 210, and defining the first aperture 231 of each cavity 220, 220'. The first cavity-containing element therefore uses an identical height for all the partitions 221 and sub-partitions 221*a* that it includes.

The sub-partitions 221*a*', 221*b*' form part of a second cavity-containing element, superposed with the first cavity-containing element, i.e. it is located between the first cavity-containing element and the perforated mask 240. Thus the module 201 comprises a first standardized cavity-containing element on which a second cavity-containing element is superposed to increase the depth of at least certain cavities. Advantageously the sub-partitions 221*a*', 221*b*' have a height that increases from one edge of the module 201 to the other.

The partitions 221 comprising a single sub-partition, and the sub-partitions 221*a*, 221*a*', 221*b*' have the same characteristics as the partitions 21 of the first embodiment. Thus the sub-partitions are standardized elements, or elements at least having a standardized design, thus making it possible to reduce design and/or manufacturing costs.

This embodiment allows the module 201 to be adapted to the exterior curve of the vehicle in which it is intended to be installed.

It should be noted that to adapt to a more pronounced curve, it is possible to superpose three or more sub-partitions to form a partition. The sub-partitions may have the characteristics described above.

Figure 3:
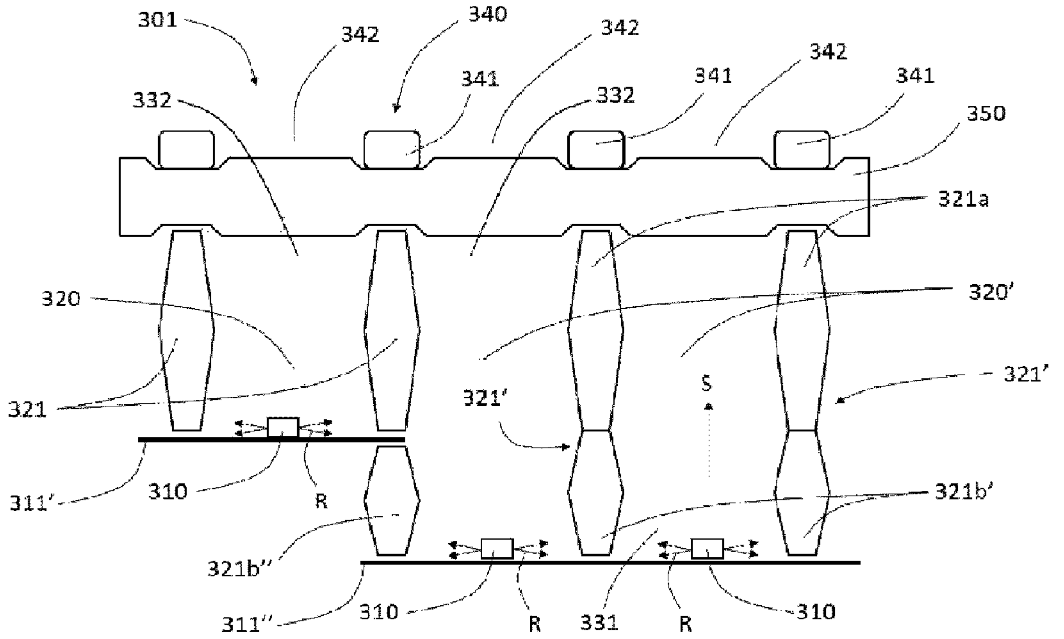
FIG. 3 is a schematic cross-sectional view of a module according to a third embodiment of the invention.

FIG. 3 is a schematic cross-sectional view of a module according to a third embodiment of the invention. This embodiment differs from the second embodiment in that the first cavity-containing element is this time placed facing the perforated mask 340 and in that the module comprises a first carrier 311' and a second carrier 311" for the light sources 310. The second carrier 311" is offset rearwardly with respect to the first carrier 311', taking as a reference the direction of travel S of the light. The second cavity-containing element is located between the first cavity-containing element and the light sources 310 located on the second carrier 311".

The second cavity-containing element comprises sub-partitions 321*b*' having a similar or identical height. Each sub-partition 321*b*' advantageously makes contact with the sub-partitions 321*a* of the first cavity-containing element with which it defines a partition 321'. The second cavity-containing element also comprises at least one sub-partition 321*b*" of a height different from that of the sub-partitions 321*b*', in particular a smaller height. This sub-partition 312*b*" is located on the border of the second cavity-containing element, and is intended to lie at least partially under the first carrier 311'. This configuration is an advantageous way of making all the cavities 320, 320' an identical width, while using a first carrier 311' of substantial extent, this allowing a good dissipation of the heat generated by the light sources 310 located on said first carrier 311'.

The partitions 321 comprising a single sub-partition, and the sub-partitions 321*a*, 321*b*', 321*b*" have the same characteristics as the partitions 21 of the first embodiment.

This embodiment allows the depth of the module to be adapted, in particular when the exterior curve of the vehicle in which it is intended to be installed is not very pronounced.

Figure 4:
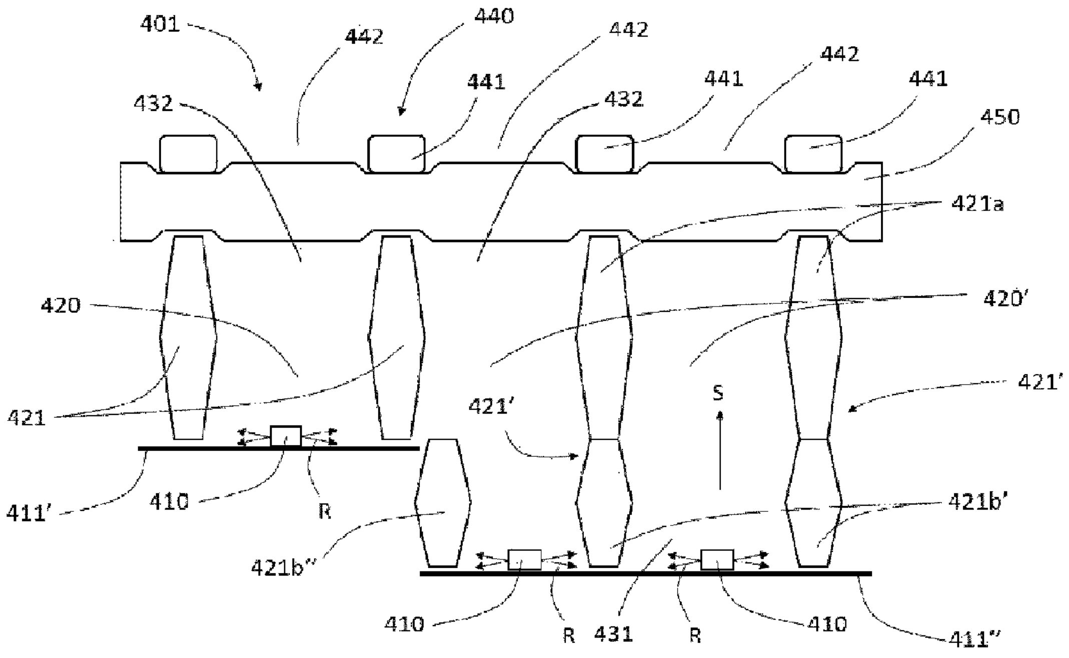
FIG. 4 is a schematic cross-sectional view of a module according to a fourth embodiment of the invention.

FIG. 4 is a schematic cross-sectional view of a module according to a fourth embodiment of the invention. This embodiment differs from the third embodiment in that the partition 421*b*" is not located under the carrier 411' but on its side. This configuration is an advantageous way of obtaining standardized sub-partitions 421*b*', 421*b*", i.e. partitions having an identical cross section.

The partitions 421 comprising a single sub-partition, and the sub-partitions 421*a*, 421*b*', 421*b*" have the same characteristics as the partitions 21 of the first embodiment.

In the third and fourth embodiments, it should be noted that to adapt to a depth that changes more pronouncedly, it is possible to superpose three or more sub-partitions to form a partition. The sub-partitions may have the characteristics described above.

According to one embodiment (not shown), the first cavity-containing element of the third and fourth embodiments comprises partitions of variable height, in a manner similar to what was described for the second cavity-containing element of the second embodiment. This makes it possible to adapt the module 301, 401 of the third and fourth embodiments to be further adapted to the exterior curve of the vehicle in which it is intended to be installed.

Figure 5A:
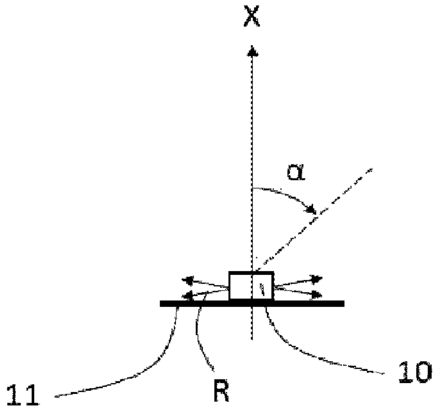
FIG. 5*a* is a schematic side view of a light source positioned on a carrier.
Figure 5B:
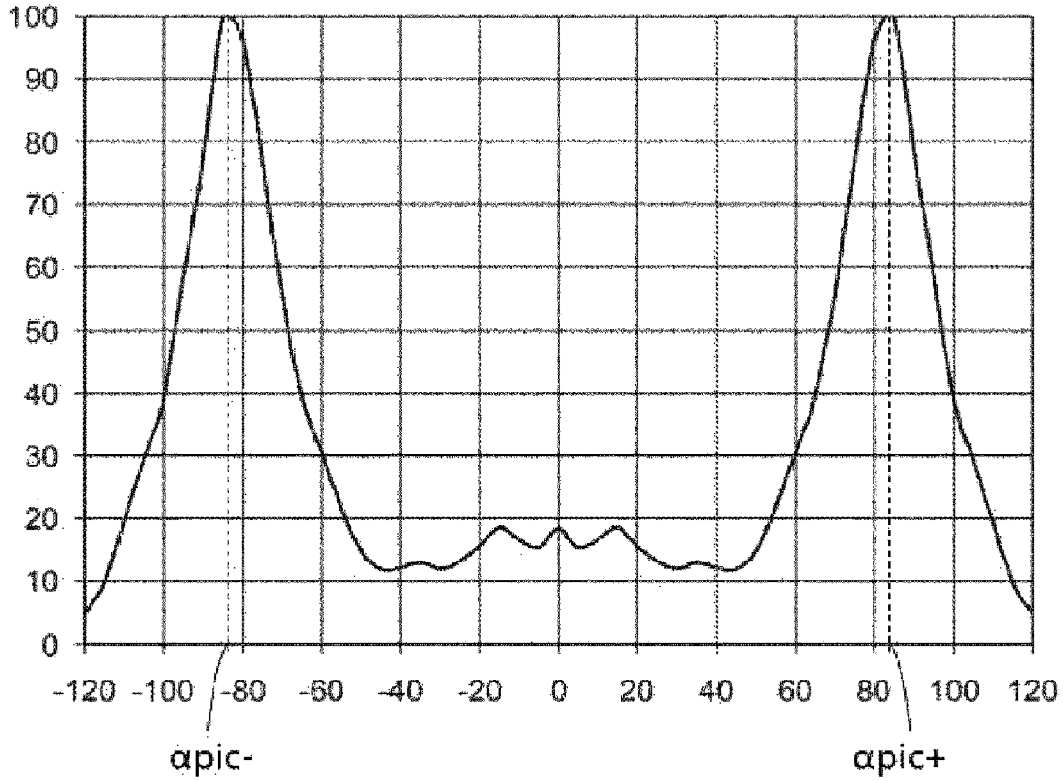
FIG. 5*b* is a graph showing one example of relative intensity of a radially emitting light source.

With reference to FIGS. 5*a* and 5*b*, the light-emission characteristics of a radially emitting light source will now be described.

FIG. 5*a* shows a schematic side view of a light source 10 positioned on a carrier 11. The light source 10 has a mounting axis X, perpendicular to the carrier 11. The light source 10, when it is supplied with electricity, emits light rays R, mainly oriented laterally with respect to the mounting axis X. These form a light-intensity indicator that depends on the direction measured by the angle $\alpha$ with respect to the mounting axis X.

FIG. 5*b* shows a diagram of an example of relative intensity of the light source in FIG. 5*a*. In other words, it is a graph of the light-intensity indicator of the light source.

The x-axis corresponds to the value of the angle $\alpha$. The y-axis corresponds to the relative value of light intensity emitted by the light source 10 in the direction corresponding to the angle $\alpha$. The value 100 is assigned to the maximum intensity emitted by the source in a given direction. The curve is thus expressed as a percentage of this maximum value.

It may be seen from this graph that the emission of the light source 10 is symmetrical with respect to the mounting axis X, i.e. the intensity value is substantially equal for a direction corresponding to the angle $+\alpha$ and to the angle $-\alpha$. More precisely, the plot in FIG. 5*b* represents the emission of the source in a radial plane containing the mounting axis X. Thus, the emission of the light source 10 has a symmetry of revolution about said mounting axis X, i.e. whatever the orientation of the radial plane about the mounting axis X.

For the sake of convenience the notation $+\alpha$ and $-\alpha$ will be used only to specify the orientation toward the right or toward the left of the direction in question. When only the absolute value $\alpha$ is used, this means that the characteristic applies equally to both sides.

In particular, a maximum value, or emission peak, is found at angles $\alpha$pic+ and $\alpha$pic− of about +85° and −85°, respectively. The notation $\alpha$pic is used to designate the absolute value of the angles $\alpha$pic+ and $\alpha$pic−. Moreover, the curve remains above the value 50 for angles $\alpha$ comprised between about 69° and 97°, thus defining a full width at half maximum of 28° distributed around each emission peak. Such an orientation of the emission peak allows, when the light source is installed in the module of the invention, a substantial part of the light flux that it emits to be oriented in the direction of the partitions 21 of the cavity 20.

It will also be noted that the curve remains at a low value, less than 20, over an angular range extending from about −53° to +53°.

It is advantageous to have a low light-intensity value in proximity to the mounting axis X. Specifically, when the source 10 is placed facing a cavity 20 of the module according to the invention, the mounting axis X is substantially parallel to the body of the cavity 20, i.e. to the average direction connecting the first aperture 31 and the second aperture 32. Thus only a small number of light rays go directly from the light source 10 to the second aperture without striking the partitions 21 of the cavity 20. An effect leading to a light spot in the pixel, in the position of the light source 10, is thus avoided.

Of course other forms of emission patterns are possible for a radially emitting source, provided that little light is emitted in proximity to the mounting axis X, and that a large part of the flux is oriented laterally so as to strike the partitions 21.

Thus, the emission peak may be obtained for another angle value $\alpha$pic+, $\alpha$pic−. Angle values $\alpha$pic higher than or equal to 45° are well suited to ensuring the orientation of a substantial part of the flux toward the partitions of the cavities. Moreover, it is advantageous for the value of the angle $\alpha$pic of the emission peak to be lower than 90°. Specifically, higher values would lead to a substantial part of the light going backward and not entering the cavity associated with the light source.

Moreover, it is important for the emission pattern to have low values, in particular values lower than or equal to 20, up to an angle $\alpha$ of 30°. Thus, when the light source is installed in the module of the invention, only a small part of the light flux that it emits is oriented directly in the direction of the second aperture and does not strike the partitions 21 of the cavity 20, thus avoiding the creation of a light spot, i.e. an area of extra brightness, toward the middle of the pixel. The overall uniformity of the pixel is improved thereby.

The full width at half maximum may also take other values than those indicated above. It may be relatively narrow, and distributed symmetrically or asymmetrically about the emission peak.

It is advantageous for it to be such that, when the light source is installed in the module of the invention, the angular sector that it covers is oriented in the direction of the partitions 21. Thus, the full width at half maximum may be variable, in particular depending on the angle $\alpha$pic of the emission peak.

When said angle $\alpha$pic is such that the emission peak is oriented toward one end of the partition 21, i.e. in proximity to the first or second aperture, it is advantageous for the full width at half maximum to be less or equal to 30°. This is particularly the case for $\alpha$pic comprised between 75 and 90°, or between 45 and 55°.

In contrast, when the angle $\alpha$pic is such that the emission peak aims toward the middle of the partition 21, i.e. at a distance from the first or second aperture, the full width at half maximum may take higher values. However, it is advantageous for it to remain less than or equal to 60° to guarantee that all of the light emission located in this angular sector is oriented toward said partition 21. Such a situation is notably obtained for αpic comprised between 55 and 75°, and more specifically between 60 and 70°.

Furthermore, when said angle αpic is such that the emission peak is oriented toward one end of the partition 21, it is advantageous for the full width at half maximum to be asymmetrical about the emission peak, in order to limit the quantity of light emitted in a direction not oriented toward said partition 21. More precisely, if the angle αpic is large, in particular comprised between 75 and 90°, it is advantageous for the angular difference between the emission peak and the value at half maximum to be smaller for the angle αt half maximum greater than αpic than for the angle αt half maximum less than αpic. This prevents too much light flux from being sent beyond the partition 21 on the side of the first aperture. This is the case of the configuration shown in FIG. 5*b*. The angle αpic is about equal to 85°. The full width at half maximum is equal to 97°−85°=12° for the angular part greater than αpic, and 85°−69°=16° for the angular part less than αpic.

Conversely, if the angle αpic is small, in particular comprised between 45 and 55°, it is advantageous for the angular difference between the emission peak and the value at half maximum to be smaller for the angle αt half maximum less than αpic than for the angle αt half maximum greater than αpic. This prevents too much light flux from being sent beyond the partition 21 on the side of the second aperture.

According to another embodiment, the emission of the light source does not have symmetry of revolution. However, the characteristics described above for a symmetrical emission of revolution are also applicable, and are to be understood with respect to a given radial plane containing the mounting axis X, and able to vary from one radial plane to another. In said radial plane they may also be different between the positive angle values α, and the negative angle values α.

It will in particular be noted that it is advantageous for the value of the angle αpic to be higher in a direction corresponding to a partition 21 closer to the light source, and to be lower in a direction corresponding to a partition 21 further away of the light source. The terms "closer" and "further" are to be understood here relatively to each other.

The invention claimed is:

1. A motor-vehicle light-emitting module comprising:

a plurality of light sources configured to emit light rays radially; and a plurality of cavities each having a first aperture and a second aperture opposite the first aperture, each light source being associated with one cavity, so that at least part of the light rays emitted by each light source enters via the first aperture of the associated cavity and exits said associated cavity via the second aperture, wherein the cavities are formed by partitions the shape of which, in longitudinal cross section, is that of two opposite trapezoids the large bases of which are common.

2. The light-emitting module as claimed in claim 1, wherein the light-emitting module comprises a perforated mask located at a distance from the plurality of light sources in a direction of propagation S of the light, the perforated mask comprising a grid forming a plurality of light-emitting cells facing the cavities and the associated light sources, each light-emitting cell being separate from a directly adjacent light-emitting cell.

3. The light-emitting module as claimed in claim 2, wherein the light-emitting module comprises a mask carrier placed facing the second apertures, so that it is passed through by the light rays, and bearing the perforated mask.

4. The light-emitting module as claimed in claim 3, wherein the mask carrier is a diffuser.

5. The light-emitting module as claimed in claim 4, wherein the perforated mask is integrally formed with the mask carrier, the perforated mask and the mask carrier being obtained by bi-injection molding of plastics.

6. The light-emitting module as claimed in claim 4, wherein the perforated mask is attached to the mask carrier, the perforated mask being securely fastened to the carrier by adhesive bonding or by welding.

7. The light-emitting module as claimed in claim 4, wherein the perforated mask is deposited on the mask carrier, the grid of the perforated mask being formed by a layer of an opaque material deposited on a face of the perforated mask.

8. The light-emitting module as claimed in claim 2, wherein the cavities are formed by partitions of white color.

9. The light-emitting module as claimed in claim 2, wherein the cavities are formed by partitions that have at least one textured wall in order to scatter light rays that strike them.

10. The light-emitting module as claimed in claim 3, wherein the perforated mask is integrally formed with the mask carrier, the perforated mask and the mask carrier being obtained by bi-injection molding of plastics.

11. The light-emitting module as claimed in claim 3, wherein the perforated mask is attached to the mask carrier, the perforated mask being securely fastened to the carrier by adhesive bonding or by welding.

12. The light-emitting module as claimed in claim 3, wherein the perforated mask is deposited on the mask carrier, the grid of the perforated mask being formed by a layer of an opaque material deposited on a face of the perforated mask.

13. The light-emitting module as claimed in claim 1, wherein the cavities are formed by partitions of white color.

14. The light-emitting module as claimed in claim 13, wherein some partitions are composed of a superposition of a plurality of sub-partitions.

15. The light-emitting module as claimed in claim 1, wherein the cavities are formed by partitions that have at least one textured wall in order to scatter light rays that strike them.

16. The light-emitting module as claimed in claim 15, wherein some partitions are composed of a superposition of a plurality of sub-partitions.

17. The light-emitting module as claimed in claim 1, wherein the light sources comprise one or more radially emitting light-emitting diodes.

* * * * *